United States Patent
Kaschmieder et al.

(10) Patent No.: US 11,311,021 B2
(45) Date of Patent: Apr. 26, 2022

(54) CONCENTRATING FERMENTED DAIRY PRODUCTS

(71) Applicant: Tetra Laval Holdings & Finance S.A., Pully (CH)

(72) Inventors: Erwin Kaschmieder, Tormestorp (SE); Aulikki Kemppainen, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/957,302

(22) PCT Filed: Dec. 18, 2018

(86) PCT No.: PCT/EP2018/085589
§ 371 (c)(1),
(2) Date: Jun. 23, 2020

(87) PCT Pub. No.: WO2019/129545
PCT Pub. Date: Jul. 4, 2019

(65) Prior Publication Data
US 2020/0383344 A1  Dec. 10, 2020

(30) Foreign Application Priority Data
Dec. 27, 2017  (EP) .................................. 17210762

(51) Int. Cl.
*A23C 9/123* (2006.01)
*A23C 9/12* (2006.01)
*A23C 1/14* (2006.01)

(52) U.S. Cl.
CPC .............. *A23C 9/123* (2013.01); *A23C 9/122* (2013.01); *A23C 1/14* (2013.01); *A23C 2210/252* (2013.01); *A23C 2260/05* (2013.01)

(58) Field of Classification Search
CPC ........... A23C 9/123; A23C 9/122; A23C 1/14; A23C 2210/252; A23C 2260/05
(Continued)

(56) References Cited

U.S. PATENT DOCUMENTS 2,838,481 A * 6/1958 Franke .................. C11D 15/00
530/208
4,434,184 A * 2/1984 Kharrazi .............. A23C 9/1307
426/36
(Continued)

FOREIGN PATENT DOCUMENTS

DE  20 2011 051733 U1  11/2011
SE     529 821 C2  10/2007
(Continued)

OTHER PUBLICATIONS

International Search Report for corresponding Application No. PCT/EP2018/085589, dated Mar. 15, 2019.
(Continued)

*Primary Examiner* — Brent T O'Hern
(74) *Attorney, Agent, or Firm* — Renner, Otto, Boisselle & Sklar, LLP

(57) ABSTRACT

A method and system for processing a fermented dairy product, including feeding, in a product feed conduit, fermented dairy product to a separator, separating the fermented dairy product into a heavy phase and a light phase, returning a part of the light phase to the product feed conduit, such that the returned part of the light phase is mixed with fermented dairy product that is fed into the separator, while another part of the light phase is removed from the fermented dairy product, such that the heavy phase forms a concentrated, fermented dairy product.

9 Claims, 2 Drawing Sheets

(58) Field of Classification Search
USPC .......................................................... 426/43
See application file for complete search history.

(56) References Cited

U.S. PATENT DOCUMENTS

| | | |
|---|---|---|
| 4,828,865 A | 5/1989 | Kohlstette |
| 5,167,807 A | 12/1992 | Peterson |
| 2011/0293789 A1 | 12/2011 | Blondeel |

FOREIGN PATENT DOCUMENTS

| | | | | |
|---|---|---|---|---|
| WO | WO-8601436 A1 * | 3/1986 | ............... | B04B 1/14 |
| WO | 2015/008099 A2 | 1/2015 | | |

OTHER PUBLICATIONS

Extended European Search Report for corresponding Application No. 17210762.5, dated May 14, 2018.

* cited by examiner

CONCENTRATING FERMENTED DAIRY PRODUCTS

TECHNICAL FIELD

The invention relates to processing fermented dairy products. In particular, it relates to concentrating fermented dairy products.

BACKGROUND

Today many different processing methods are used for producing a large variety of dairy products. One variety of dairy products are fermented dairy products such as yoghurt, quark and skyr. Some types of fermented dairy products have been strained to give the products a relatively higher content of solids (proteins, milk sugars and minerals). The product has a generally thick texture due to the high content of solids and is often referred to as a "strained" or "concentrated" fermented dairy product. The concentration may be achieved by concentrating the milk by filtration to remove a portion of the water before addition of fermentation cultures. Alternatively, after fermentation of milk, the fermented product may be centrifuged and/or membrane-filtered to remove whey and thereby increase the concentration.

The prior art is successfully used for large scale production of concentrated, fermented dairy products. However, when using centrifugal separators for concentrating the product by removing whey, which is the lighter phase, there might be a tendency that the concentrated product, which is the heavy phase, causes fouling in the separator. Fouling generally always occur in various grades in equipment that are used for processing dairy products. However, it is desired that fouling is reduced to the largest extent possible, since this reduces the required cleaning as well as increases production time and efficiency.

SUMMARY

It is an object of the invention to at least partly overcome one or more limitations of the prior art. In particular, it is an object to efficiently concentrate a fermented dairy product while still assuring that long operational times can be accomplished.

In one aspect of the invention, this is achieved by a method for processing a fermented dairy product, which method comprises: feeding, via a product feed conduit connected to a centrifugal separator, fermented dairy product into the separator; separating, with the centrifugal separator, the fermented dairy product into a heavy phase and a light phase; receiving, in a first light phase conduit, a first part of the separated light phase; receiving, in a second light phase conduit, a second part of the separated light phase; receiving, in a heavy phase conduit, the separated heavy phase. The second part of the light phase is returned to the product feed conduit, such that the second part of the light phase is mixed with fermented dairy product that is fed into the separator. The first light phase is thereby removed from fermented dairy product that is fed into the separator, such that the heavy phase forms a concentrated, fermented dairy product.

Basically, the method operates to dilute the flow of un-separated fermented dairy product with a part of the light phase (whey) that is separated out from fermented dairy product that earlier passed through the separator.

The method is advantageous in that the infeed to the separator, which is the combination of un-separated, fermented dairy product and the returned, second part of the light phase, becomes more viscous than the un-separated, fermented dairy product alone. It has been seen that this decreases fouling inside the separator, as it enables easier flow of liquids to separation outlets in the separator, i.e. less or even no heavy phase is "over concentrated" and stuck inside the separator as more or less solid product cakes.

In another aspect, the above objects are achieved by a system that is configured to process a fermented dairy product. The system comprises: a centrifugal separator that is arranged to separate fermented dairy product into a heavy phase and a light phase; a product feed conduit connected to the separator for feeding fermented dairy product into the separator; a first light phase conduit that is arranged to receive a first part of the light phase separated by the separator; a second light phase conduit that is arranged to receive a second part of the light phase separated by the separator; and a heavy phase conduit arranged to receive the heavy phase separated by the separator. The second phase conduit is arranged to return the second part of the light phase to the product feed conduit, such that the second part of the light phase is mixed with fermented dairy product that is fed into the separator. The first light phase is thereby removed from fermented dairy product fed into the separator, such that the heavy phase forms a concentrated, fermented dairy product.

All features and embodiments described herein in connection with the method may be implemented for the system, and vice versa.

Still other objectives, features, aspects and advantages of the invention will appear from the following detailed description as well as from the drawings.

BRIEF DESCRIPTION OF DRAWINGS

Embodiments of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
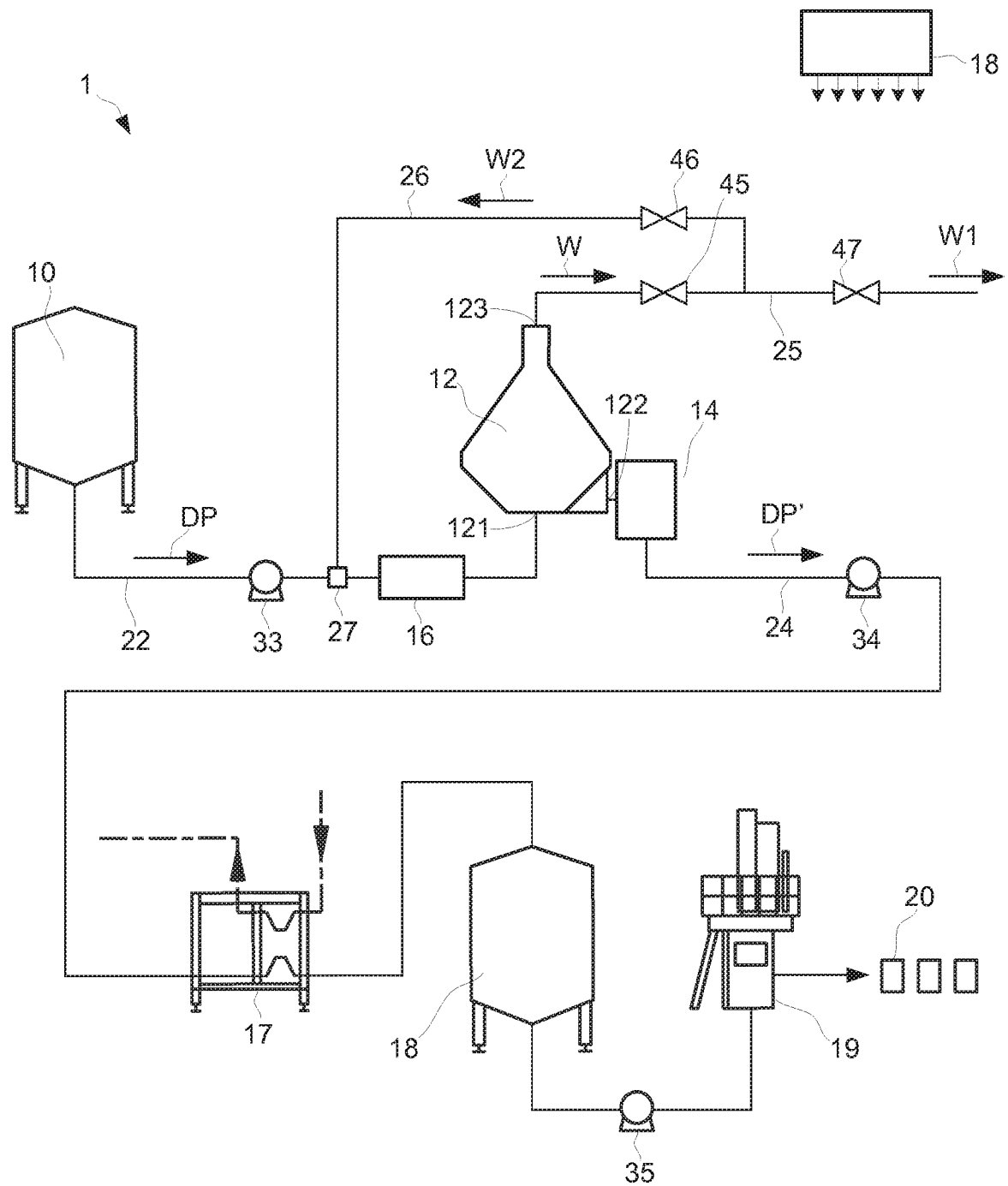
FIG. 1 is a schematic view of a system for processing a fermented dairy product.

With reference to FIG. 1, an exemplary system 1 for processing a fermented dairy product DP is illustrated. The system 1 has a tank 10 that holds the fermented dairy product DP. The fermented dairy product DP may per se be produced by using any conventional technique, such as those commonly used for producing yoghurt, quark and skyr. The fermented dairy product DP is introduced into the tank 10 in any suitable and commonly used way. This may include filling the tank with 10 standardized, homogenized and pasteurized milk and a fermentation culture, and allowing the culture to ferment the milk until a fermented dairy product DP is formed.

A product feed conduit 22 is connected to the tank 10 for feeding the fermented dairy product DP to a centrifugal separator 12. A conventional pump 33 is arranged in the product feed conduit 22 for pumping the fermented dairy product DP from the tank 10 to a feed inlet 121 of the separator 12.

A stack of separation disks are arranged inside the separator 12 and are rotated to separate the fermented dairy product DP into a heavy phase DP' and a light phase W. The heavy phase DP' is then more concentrated than the fermented dairy product DP, i.e. it becomes a concentrated, fermented dairy product DP'. The light phase W is primarily whey, which has a higher viscosity than the fermented dairy product DP that is introduced into the separator 12.

The heavy phase DP' leaves the separator via a heavy phase outlet 122 that is connected to a cyclone 14 that receives and decelerates the heavy phase DP'. The heavy phase DP' is then received in a heavy phase conduit 24, that is connected to the cyclone 14. A pump 34 in the heavy phase conduit 24 pumps the heavy phase DP' to a cooling unit 17 that reduces the temperature of the heavy phase DP'. The cooled heavy phase DP' is next fed to ta holding tank 18 that holds the heavy phase DP' before it is filled into packages 20 by a packaging machine 19. A pump 35 feeds the heavy phase DP' from the holding tank 18 to the packaging machine 19. The heavy phase DP' is sold to consumers as concentrated, fermented dairy product, such as high protein yogurts, quarks, skyrs or any as any other dairy based product that has been strained (concentrated).

The light phase W leaves the separator 12 via a light phase outlet 123 in the separator 12. It passes a valve 45 that regulates the pressure in the separator 12, and a first part W1 of the separated light phase W is conveyed into a first light phase conduit 25, while a second part W2 of the separated light phase W is conveyed into a second light phase conduit 26. The first light phase conduit 25 may be directly connected to the light phase outlet 123 and the second light phase conduit 26 may branch off from the first light phase conduit 25. Other arrangements for dividing the light phase into the streams are conceivable.

A valve 47 in the first light phase conduit 25 and a valve 46 in the second light phase conduit 26 may be arranged to control how much of the light phase W shall be transferred to first light phase conduit 25 respectively to the second light phase conduit 26.

The second light phase conduit 26 is connected to the product feed conduit 22 at a connection point 27 in the product feed conduit 22, to thereby return the second part W2 of the light phase W to the product feed conduit 22. This decreases the viscosity of fermented dairy product DP that is fed into the separator 12. The connection point 27 may be a simple three-way branch. The pressure is the second light phase conduit 26 is, due to the separator 12, so much higher than the pressure in the product feed conduit 22 that no fermented dairy product DP will flow from the product feed conduit 22 into the second light phase conduit 26.

The second light phase conduit 26 thereby provides for that the second part W2 of the light phase W is mixed with fermented dairy product DP that is fed from the tank 10 and into the separator 12. The first part W1 of the light phase W, on the other hand, is removed from fermented dairy product DP fed into the separator 12, and can be used for other purpose. Since the first light phase W1 is removed, there is a net removal or whey from fermented dairy product DP that is fed into the separator 12. The heavy phase DP' thereby forms a concentrated, fermented dairy product. Of course, since the second part W2 is mixed with the fermented dairy product DP, the light phase W is then removed from the combination (mixture) of the fermented dairy product DP and the second part W2. Still, since the first part W1 is permanently removed from the fermented dairy product DP, there is a net removal of light phase from the fermented dairy product DP, so that a concentrated fermented dairy product DP' is formed.

A mixing unit 16 may be arranged in the product feed conduit 22 for mixing the fermented dairy product DP and the returned second part W2 of the light phase. The mixing unit 16 is then, obviously, arranged downstream the connection point 27, and may be a static mixer. Alternatively, the connection point 27 is part of the mixing unit 16. In this context, a static mixer may be any mixer where the energy needed for accomplishing the mixing of fluids comes from a loss in pressure when the fluids flow through the mixer.

A conventional system controller 18 is used for controlling the various components in the system 1 and for implementing a method for processing the fermented dairy product DP into the concentrated, fermented dairy product DP'.

Figure 2:
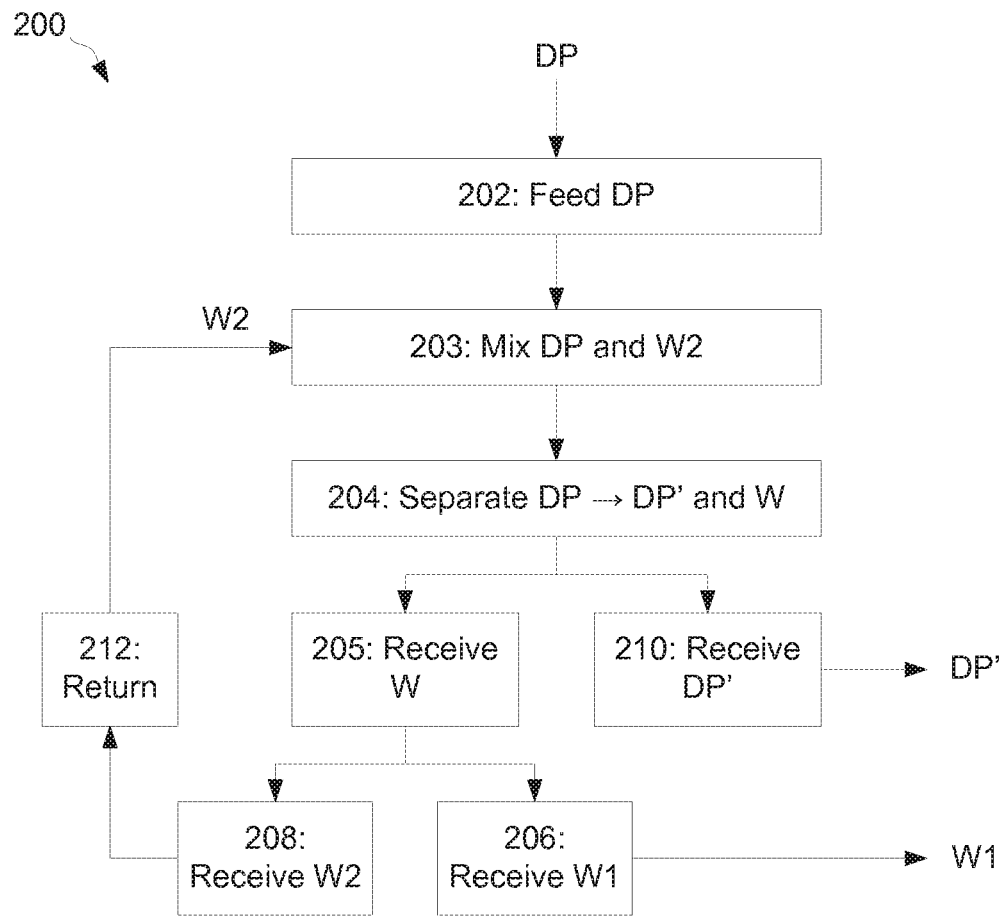
FIG. 2 is a flow chart illustrating a method for processing a fermented dairy product.

With reference to FIG. 2, a flow chart illustrating a method 200 for processing a fermented dairy product DP into a concentrated, fermented dairy product DP' is illustrated. The method may be performed on, for example, the system 1 described in connection with FIG. 1.

The method comprise feeding 202, via the product feed conduit 22, fermented dairy product DP into the separator 12.

In the separator 12 the fermented dairy product DP is separated 204 into a heavy phase DP' and a light phase W. The light phase W is received 205 from the separator 12 where a first part W1 of the separated light phase W is received 206 in the first light phase conduit 24, while a second part W2 of the separated light phase W is received 208 in the second light phase conduit 26. The first part W1 of the light phase W is conveyed to be discarded or used as appropriate for some other purpose.

The separated heavy phase DP' is received 210 in a heavy phase conduit 24. The heavy phase DP' is thereafter cooled in a cooling unit 17, held in a buffer tank 10 and finally filled into packages 20 by a packaging machine 19, so that it can be sold to consumers as a concentrated, fermented dairy product DP'.

The second part W2 of the light phase W is returned 212 to the product feed conduit 22, such that the second part W2 of the light phase W is mixed 203 with fermented dairy product DP that is fed into the separator 12. The first light phase W1 is removed from fermented dairy product that is fed into the separator 12, while the second part W2 increases the viscosity of fermented dairy product DP that is fed into the separator 12. As explained, this reduces the tendency of product agglomerations in the separator. This increases production time. For example, commercially available separators that are offered by the company Tetra Pak® for concentrating fermented dairy products are capable of, when using the described method 200, continuous operation for more than 6 hours before cleaning of the separator is needed. Even longer running times such separators are possible, such as at least 8 hours, or even more than 10 hours before cleaning is needed. Using the method 200 described herein may of course be used for other separators than those offered by Tetra Pak®.

The method 200 may be performed so that the flow rate of the second part W2 of the light phase W that is returned 212 constitutes 30% to 50%, or even 35% to 45%, of the combined flow rate of the dairy product DP and the returned light phase W2. In other words, the mixture of the fermented dairy product DP and the returned part W2 of the light phase W may comprise at least 30% to 50% light phase. The remaining part is then fermented dairy product DP. This is readily accomplished by, for example, appropriate regulation of valve 46 and/or valve 47. Additionally, for controlling the mixing relationship between the fermented dairy product DP and the returned light phase W2, a valve (not shown) may also be arranged in the product feed conduit 22, upstream the connection point 27. Alternatively, the pump 33 may be controlled to give the fermented dairy product DP a flow rate that accomplishes the mixing relationship between the fermented dairy product DP and the returned part W2 of the light phase W.

The method may include controlling the flow the first part W1 of the light phase W such that the retention time in the separator 12 is, due to the returning 212 of the second part W2 of the light phase W, 30% to 50%, or even 35% to 45%, shorter as compared to not returning said second part W2 of the light phase W. Such control may be accomplished in the same way as the control that accomplishes the above described flow rate of the second part W2 of the light phase W. The retention time is the time it takes for a liquid to pass through the separator 12.

The fermented dairy product DP may comprises 8.2 wt % to 9.2 wt %, or even 8.5 wt % to 9.0 wt % solids. Herein, wt % refers to weight percentage. By adjusting how much of the light phase W is retuned via the second light phase conduit 26, it possible to obtain a heavy phase DP' (concentrated, fermented dairy product) that comprises 15.5 wt % to 20.0 wt %, or even 15.5 wt % to 16.5 wt % solids. The mixture of the fermented dairy product DP and the returned 212 second part W2 of the light phase typically comprises 5.5 wt % to 6.2 wt %, or even 5.8 wt % to 6.0 wt % solids. A flow rate through the separator 12 when testing the method was 5000 liters per hour. The light phase W, may then, for example, form about two thirds of output from the separator while the heavy phase DP' forms the rest.

From the description above follows that, although various embodiments of the invention have been described and shown, the invention is not restricted thereto, but may also be embodied in other ways within the scope of the subject-matter defined in the following claims.

The invention claimed is:

1. A method for processing a fermented dairy product, the method comprising:
   feeding, via a product feed conduit connected to a centrifugal separator, fermented dairy product into the centrifugal separator,
   separating, with the centrifugal separator, the fermented dairy product into a heavy phase and a light phase,
   receiving, in a first light phase conduit, a first part of the separated light phase,
   receiving, in a second light phase conduit, a second part of the separated light phase, and
   receiving, in a heavy phase conduit, the heavy phase that is separated, and
   returning the second part of the light phase to the product feed conduit, such that the second part of the light phase is mixed with fermented dairy product that is fed into the centrifugal separator,
   the first part of the light phase thereby being removed from fermented dairy product fed into the centrifugal separator, such that the heavy phase forms a concentrated, fermented dairy product.

2. The method according to claim 1, wherein the second part of the light phase is returned at a flow rate that is 30 to 50% of a combined flow rate of the dairy product and the second part of the light phase that is fed into the centrifugal separator.

3. The method according to claim 1, wherein a retention time in the centrifugal separator is, due to returning the second part of the light phase, 30 to 50% shorter as compared to not returning said second part of the light phase.

4. The method according to claim 1, wherein the fermented dairy product comprises 8.2 to 9.2 wt % solids.

5. The method according to claim 1, wherein a mixture of the fermented dairy product and the second part of the light phase, that is returned, comprises 5.5 to 6.2 wt % solids.

6. The method according to claim 1, wherein the heavy phase that forms the concentrated, fermented dairy product comprises 15.5 to 20.0 wt % solids.

7. The method according to claim 1, comprising mixing the fermented dairy product and the second part of the light phase, that is returned, in a mixer unit.

8. The method according to claim 1, wherein the fermented dairy product is yogurt or quark.

9. The method according to claim 1, comprising running the centrifugal separator for at least 6 hours before cleaning the centrifugal separator.

\* \* \* \* \*